US010264157B2

(12) United States Patent
Oka

(10) Patent No.: US 10,264,157 B2
(45) Date of Patent: Apr. 16, 2019

(54) IMAGE PROCESSING APPARATUS, IMAGE PROCESSING METHOD AND IMAGE PROCESSING PROGRAM

(71) Applicant: Konica Minolta, Inc., Chiyoda-ku, Tokyo (JP)

(72) Inventor: Tetsuya Oka, Itami (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 183 days.

(21) Appl. No.: 15/260,842

(22) Filed: Sep. 9, 2016

(65) Prior Publication Data

US 2017/0085742 A1    Mar. 23, 2017

(30) Foreign Application Priority Data

Sep. 17, 2015    (JP) ................. 2015-183789

(51) Int. Cl.
| H04N 1/04 | (2006.01) |
| H04N 1/32 | (2006.01) |
| H04N 1/00 | (2006.01) |
| G06K 15/02 | (2006.01) |
| G06K 17/00 | (2006.01) |

(52) U.S. Cl.
CPC ..... *H04N 1/32133* (2013.01); *G06K 15/1813* (2013.01); *G06K 17/0016* (2013.01); *H04N 1/00204* (2013.01); *H04N 2201/0094* (2013.01); *H04N 2201/3269* (2013.01); *H04N 2201/3271* (2013.01)

(58) Field of Classification Search
CPC ................. H04N 1/32133; H04N 1/00204

USPC ......................................................... 358/403
See application file for complete search history.

(56) References Cited

U.S. PATENT DOCUMENTS 7,461,789 B2 *  12/2008  Katsurabayashi ..... G06Q 10/10
                                                             235/435
2012/0236368 A1    9/2012  Uchida et al.

FOREIGN PATENT DOCUMENTS

| JP | 2004-145736 A | 5/2004 |
| JP | 2005-050018 A | 2/2005 |
| JP | 2009-165088 A | 7/2009 |
| JP | 2010-262584 A | 11/2010 |
| JP | 2012-199698 A | 10/2012 |

OTHER PUBLICATIONS

Office Action (Notice of Reason for Rejection) dated Nov. 14, 2017, by the Japanese Patent Office in corresponding Japanese Patent Application No. 2015-183789, and an English Translation of the Office Action. (8 pages).

* cited by examiner

*Primary Examiner* — Houshang Safaipour
(74) *Attorney, Agent, or Firm* — Buchanan Ingersoll & Rooney PC

(57) ABSTRACT

An image processing apparatus includes: an extraction unit configured to extract a written image additionally written on printed matter on which a document is written from a read image read from the printed matter; and a generation unit configured to generate additionally written document data by writing written image information about the written image into document data that is the document described in a mark-up language.

13 Claims, 14 Drawing Sheets

CONTRACT

This agreement is made and entered into by and between Company AAA and John William as follows concerning XXX.

(1) aaaaaaaaaaaaaaaaaaaaaaaaaaaaaaaaaaaaaaaaa (2) bbbbbbbbbbbbbbbbbbbbbbbbbbbbbbbbbbbbbbbbb (3) ccccccccccccccccccccccccccccccccccccccccc (4) ddddddddddddddddddddddddddddddddddddddddd Name:

Address:

<title>CONTRACT</title>

<text>This agreement is made and entered into by and between Company AAA and John William as follows concerning XXX.</text>

<text>(1) aaaaaaaaaaaaaaaaaaaaaaaaaaaaa aaaaaaaaaaaa</text>

⋮

Name:
Address:

\<title\>CONTRACT\</title\>

\<text\>This agreement is made and entered into by and between Company AAA and John William as follows concerning XXX.\</text\>

\<text\>(1) aaaaaaaaaaaaaaaaaaaaaaaaaa aaaaaaaaaa\</text\>

...

Name:\<name\>John William\</name\>
Address:\<address\>123 ABC street, NY\</address\>

\<title\>CONTRACT\</title\>

\<text\>This agreement is made and entered into by and between Company AAA and John William as follows concerning XXX.\</text\>

\<text\>(1) aaaaaaaaaaaaaaaaaaaaaaaaaa aaaaaaaaaa\</text\>

...

Name:\<name\>dir01/image001.gif\</name\>
Address:\<address\>dir01/image002.gif\</address\>

<title>CONTRACT</title>

<text>This agreement is made and entered into by and between Company AAA and John William as follows concerning XXX.</text>

<text>(1) aaaaaaaaaaaaaaaaaaaaaaaaaaaaaa aaaaaaaaaaaa</text>

⋮

Name:<Name> </Name>
Address:<Address> </Address>

⋮

IMAGE PROCESSING APPARATUS, IMAGE PROCESSING METHOD AND IMAGE PROCESSING PROGRAM

The entire disclosure of Japanese Patent Application No. 2015-183789 filed on Sep. 17, 2015 including description, claims, drawings, and abstract are incorporated herein by reference in its entirety.

BACKGROUND OF THE INVENTION

Field of the Invention

The present invention relates to a technology to record an image written on printed matter.

Description of the Related Art

Technologies to read an image written on printed matter by the user and convert the image into electronic data so as to process the electronic data have been proposed.

According to the technology described in JP 2009-165088 A, the data management unit saves the original image data and creates the destination information about the destination to save the original image data in a printing process. The page data created in accordance with the size setting information and a two-dimensional code representing the destination information and the size setting information are synthesized so that output image data is created. Meanwhile, the code processing unit acquires the destination information and the size setting information from the two-dimensional code in the scanned image data in a difference extracting process. The original image data is acquired in accordance with the destination information. The difference reference data is created in accordance with the size setting information. The difference extraction unit extracts the difference between each page data item in the difference reference data and each page data item in the scanned data pixel by pixel.

The PC described in JP 2012-199698 A includes a comparison unit, an OCR processing unit, and a registration unit. The comparison unit compares the image data of a scanned recoding medium on which the document data stored in a shared folder is printed with the image data of the document data so as to acquire an image of the difference between the image data of the scanned recoding medium and the image data of the document data. The OCR processing unit processes the acquired image data of the difference in a character recognizing process. The registration unit links the hand-written character data that is the character data acquired in the character recognizing process and the hand-written image data that is the image data of the difference to the document data, and saves the linked data in the shared folder.

The image processing apparatus described in JP 2010-262584 A includes a print control unit, an image input unit, an extraction unit, a difference image extraction unit, and a determination unit. The print control unit prints a plurality of pages on a paper medium in accordance with the print setting information indicating the print mode, and prints the code indicating the print setting information on the paper medium. The image input unit inputs the scanned image on the paper medium. The extraction unit extracts the code from the scanned image. The difference image extraction unit generates an image to be printed including the pages in accordance with the print setting information represented by the code extracted by the extraction unit so as to extract the difference image of the difference between the image to be printed and the scanned image. The determination unit determines the correspondence relationship between the difference image and the pages included in the image to be printed.

As described above, the image written on printed matter by the user (the written image) has been scanned and converted into electronic data, separately from the original document (the document printed on the printed matter), and then the electronic data has been linked to the electronic data of the document and saved in the past. The electronic data of the written image can be used for searching for the document.

However, the usage of the electronic data of the written image for the search requires a specific search system.

SUMMARY OF THE INVENTION

In light of the foregoing, an object of the present invention is to use an existing search system without any change in order to search for a document in accordance with a written image.

To achieve the abovementioned object, according to an aspect, an image processing apparatus reflecting one aspect of the present invention comprises: an extraction unit configured to extract a written image additionally written on printed matter on which a document is written from a read image read from the printed matter; and a generation unit configured to generate additionally written document data by writing written image information about the written image into document data that is the document described in a mark-up language.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 4 is a diagram of an exemplary document;

FIG. 5 is a diagram of an exemplary source file;

FIGS. 11A and 11B are diagrams of exemplary source files;

FIG. 13 is a diagram of an exemplary source file; and

DESCRIPTION OF THE PREFERRED EMBODIMENTS

Hereinafter, an embodiment of the present invention will be described with reference to the drawings. However, the scope of the invention is not limited to the illustrated examples.

Figure 1:
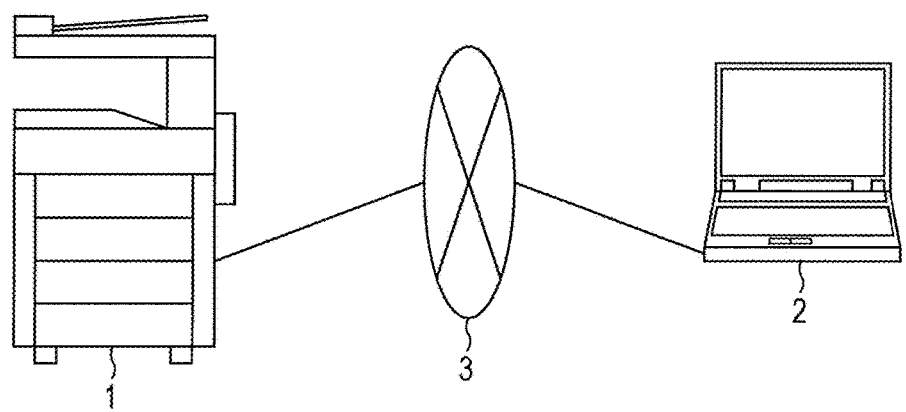
FIG. 1 is a diagram of an example of the whole configuration of a document management system.
Figure 2:
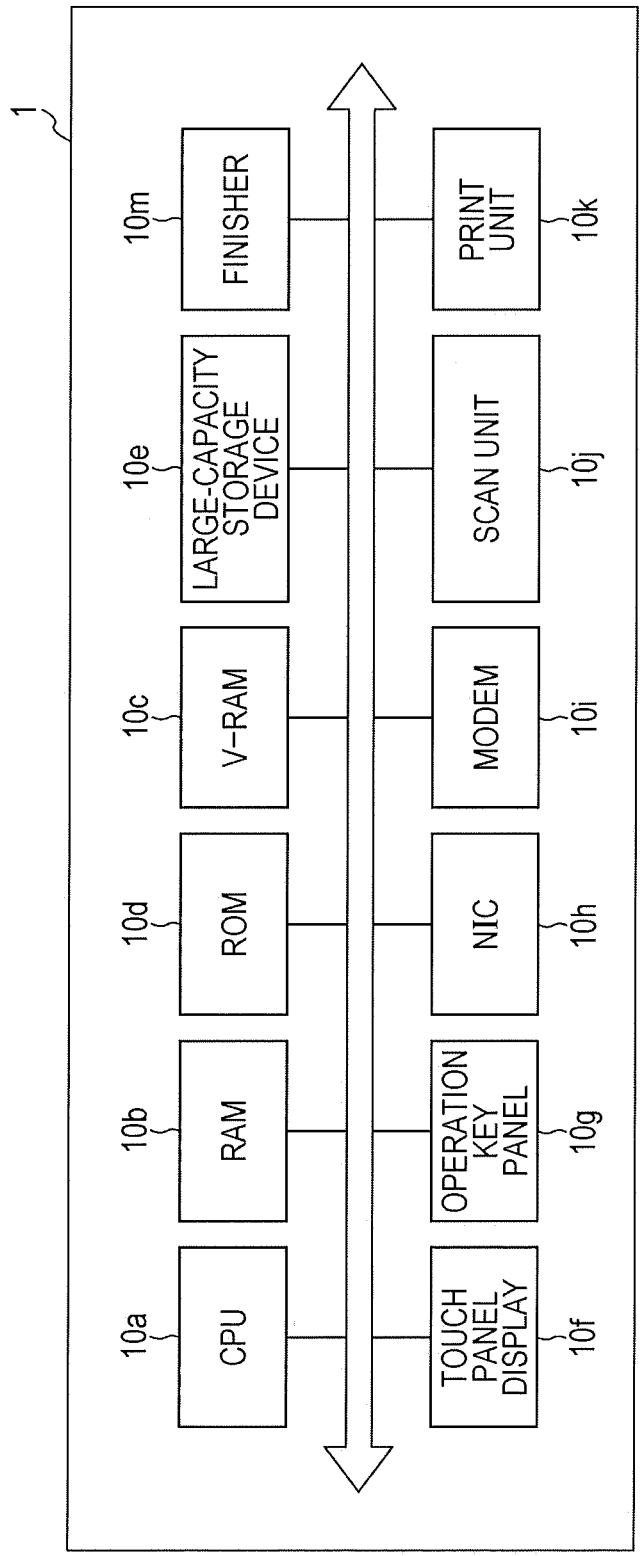
FIG. 2 is a diagram of an example of the hardware configuration of an image forming apparatus.
Figure 3:
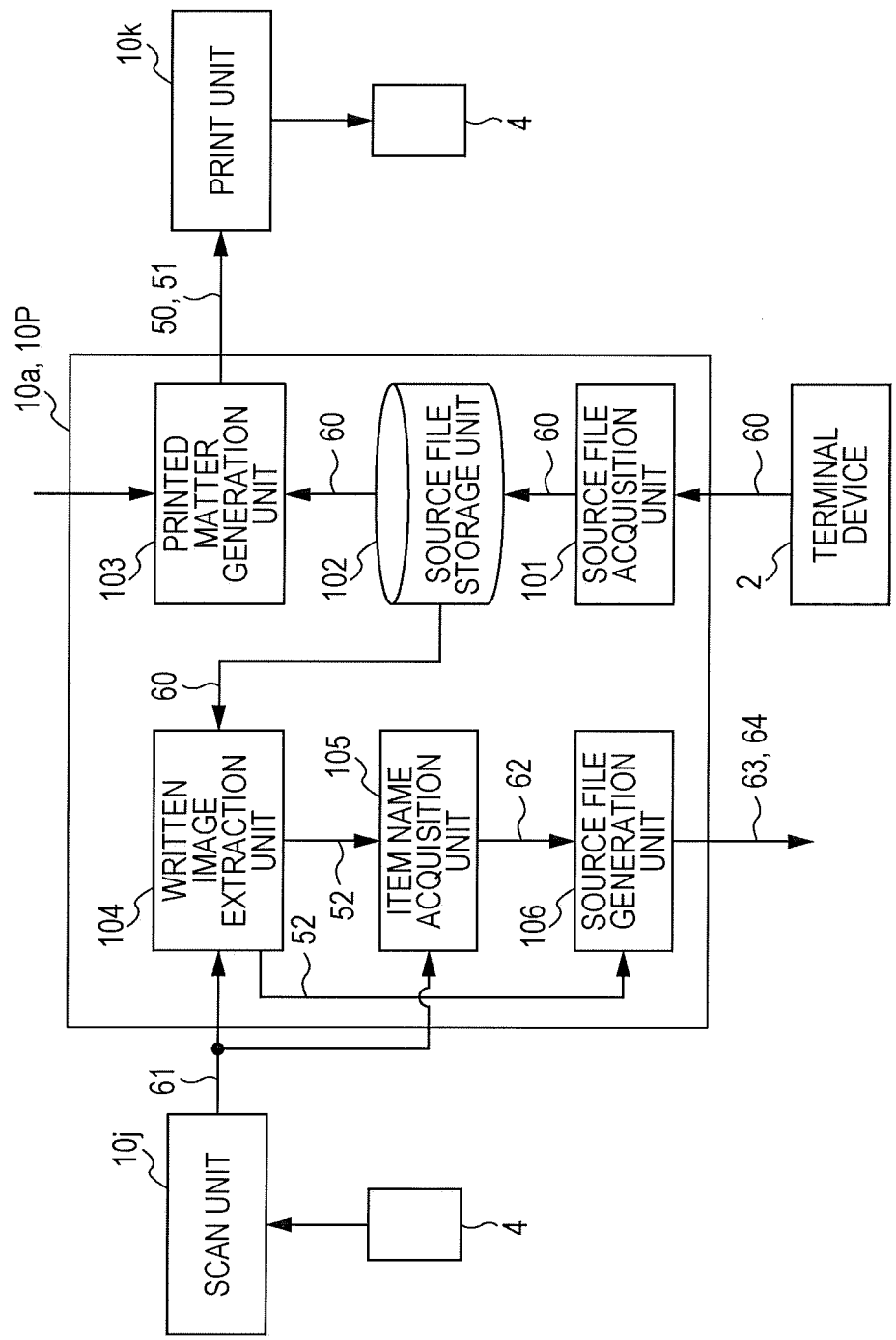
FIG. 3 is a diagram of an example of the functional configuration of the image forming apparatus.

FIG. 1 is a diagram of an example of the whole configuration of a document management system 100. FIG. 2 is a diagram of an example of the hardware configuration of an image forming apparatus 1. FIG. 3 is a diagram of an example of the functional configuration of the image forming apparatus 1.

As illustrated in FIG. 1, the document management system 100 includes, for example, the image forming apparatus 1, a terminal device 2, and a communication line 3.

The image forming apparatus 1 can communicate with the terminal device 2 via the communication line 3. For example, a Local Area Network (LAN) line, the Internet, a public line, or a dedicated line is used as the communication line 3.

The image forming apparatus 1 is an apparatus in which the functions to provide service including copying, PC printing, faxing, scanning, or box are consolidated. The image forming apparatus 1 is sometimes referred to as "Multi Function Peripherals", or "MFP".

The PC printing service is the service for printing an image on a sheet in accordance with the image data received from the terminal device 2. The PC printing service is sometimes referred to as "network printing" or "network print".

The box service is service in which a storage region referred to, for example, as a "box" or a "personal box" is provided to each user so that the user saves and manages, for example, image data in the user's storage region. The box corresponds to a "folder" or a "directory" of a personal computer.

The terminal device 2 is a client used to remotely use the service by the image forming apparatus 1. The terminal device 2 stores an application program that creates a document, and generates a file in which the document is described in a mark-up language (a source file). For example, Extensible Markup Language (XML) or Hypertext Markup Language (HTML) is used as the mark-up language.

For example, a personal computer, a smartphone, or a tablet computer can be used as the terminal device 2.

As illustrated in FIG. 2, the image forming apparatus 1 includes, for example, a Central Processing Unit (CPU) 10a, a Random Access Memory (RAM) 10b, a Video RAM (VRAM) 10c, a Read Only Memory (ROM) 10d, a large-capacity storage device 10e, a touch panel display 10f, an operation key panel 10g, a Network Interface Card (NIC) 10h, a modem 10i, a scan unit 10j, a print unit 10k, and a finisher 10m.

The touch panel display 10f displays, for example, a screen on which a message to the user is displayed, a screen on which the user inputs a command or information, and a screen on which a result of the process performed by the CPU 10a is displayed. The touch panel display 10f transmits a signal indicating the touched position to the CPU 10a.

The VRAM 10c is used to store the data of the screen to be displayed on the touch panel display 10f.

The operation key panel 10g is a so-called hardware keyboard, and includes, for example, a numeric keypad, a start key, a stop key, and a function key.

The NIC 10h communicates with another device in a protocol such as Transmission Control Protocol/Internet Protocol (TCP/IP).

The modem 10i exchanges image data with a facsimile terminal in a protocol such as G3.

The scan unit 10j generates image data by reading the image on the sheet set on a glass platen.

The print unit 10k prints not only the image read by the scan unit 10j but also the image that the NIC 10h or modem 10i receives from another device on a sheet.

The finisher 10m fastens the sheets on which the image is printed by the print unit 10k, namely, printed matter with a stapler or punches holes on the sheets.

The ROM 10d or the large-capacity storage device 10e stores programs to provide the exemplary service described above, and additionally stores the document structuring program 10P.

The document structuring program 10P generates the printed matter of a document represented in the source file described in a mark-up language by printing the document on a sheet. Additionally, the image written on the printed matter by the user can be reflected on the source file.

The programs are loaded on the RAM 10b as necessary and executed by the CPU 10a. For example, a hard disk drive or a Solid State Drive (SSD) is used as the large-capacity storage device 10e.

Executing the document structuring program 10P causes the image forming apparatus 1 to implement the functions, for example, of the source file acquisition unit 101, the source file storage unit 102, the printed matter generation unit 103, the written image extraction unit 104, the item name acquisition unit 105, and the source file generation unit 106 illustrated in FIG. 3.

The process that each of the source file acquisition unit 101 to the source file generation unit 106 performs will be described hereinafter.

Figure 6:
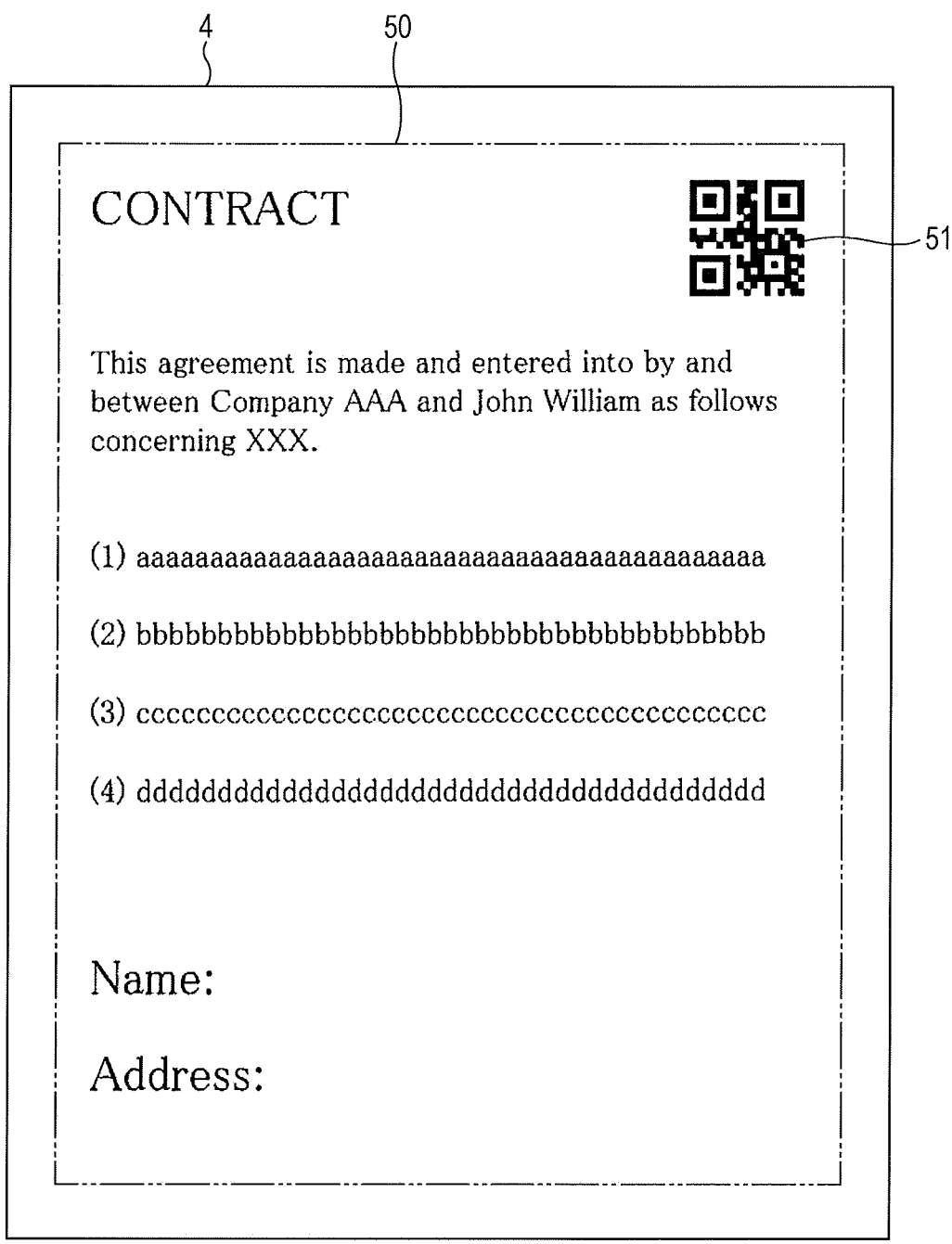
FIG. 6 is a diagram of exemplary printed matter.
Figure 7:
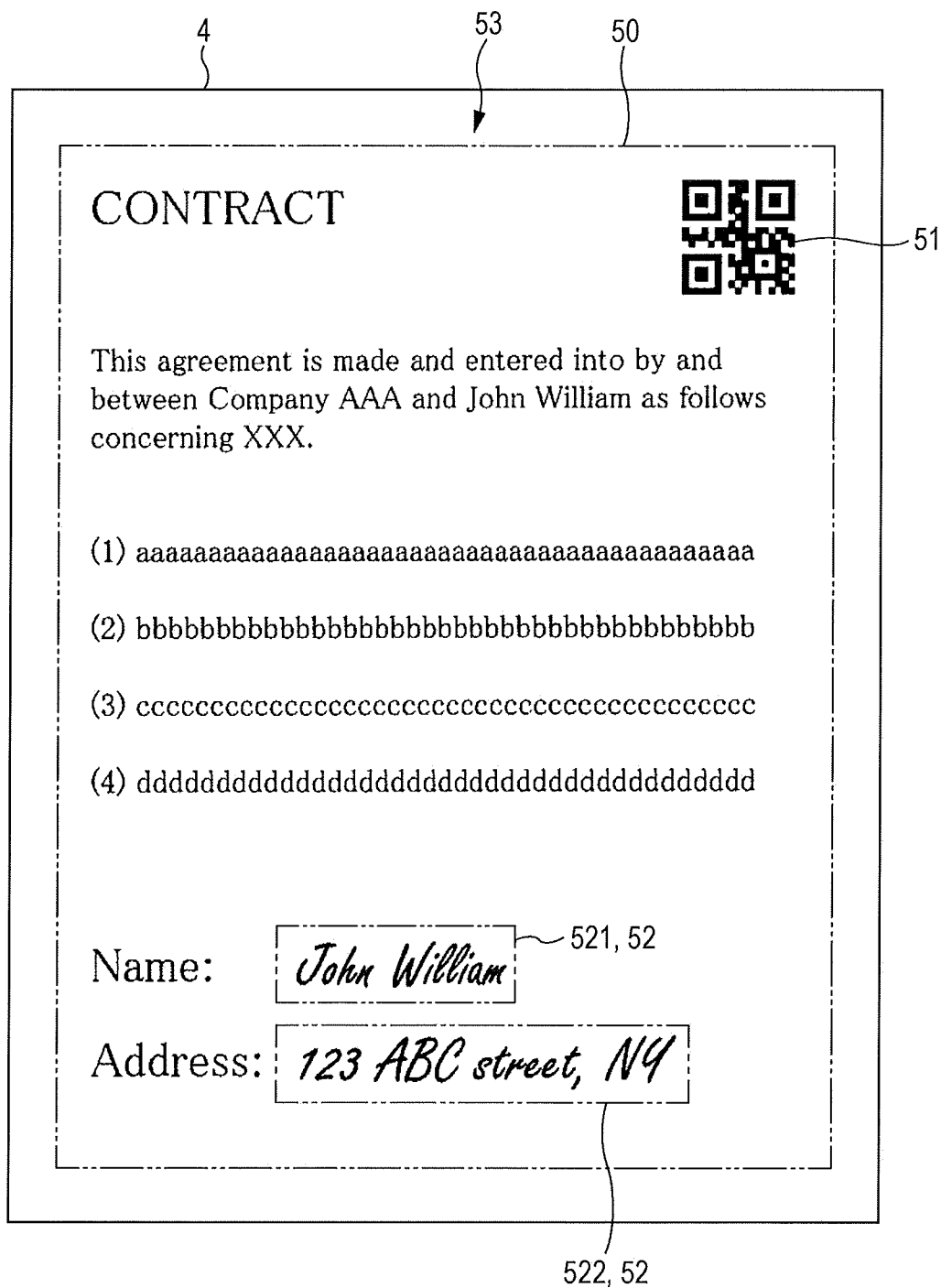
FIG. 7 is a diagram of an exemplary read image.
Figure 8:
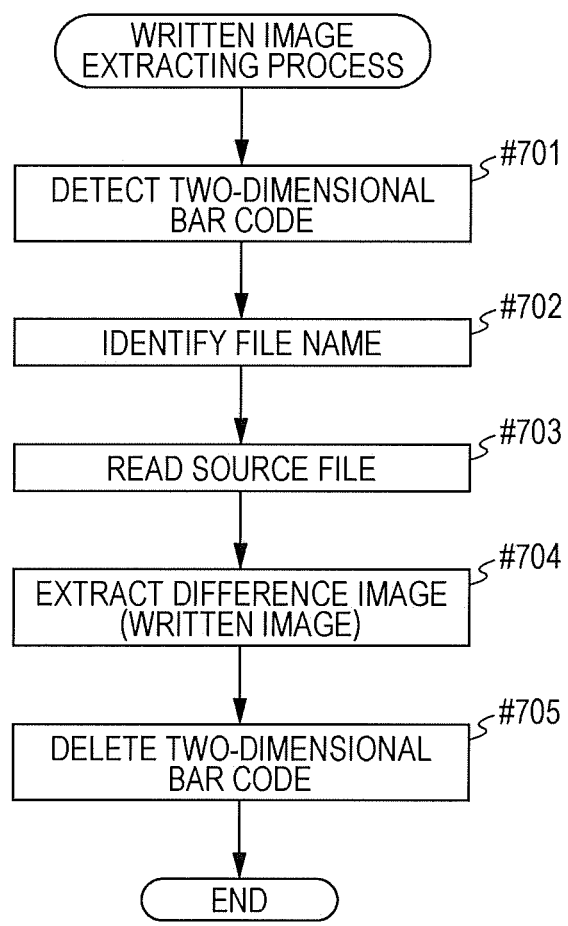
FIG. 8 is an explanatory flowchart of an exemplary flow of a written image extracting process.
Figure 9:
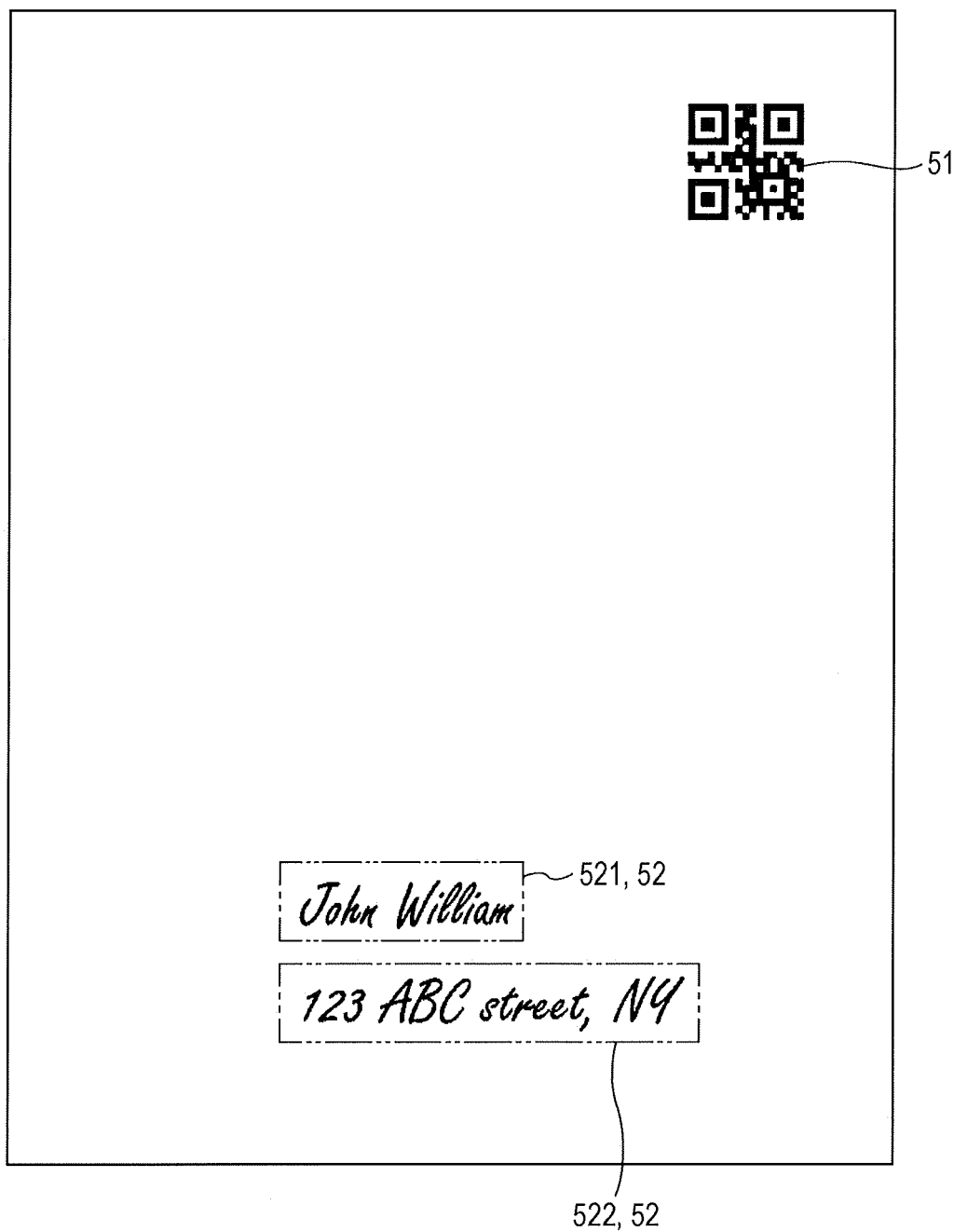
FIG. 9 is a diagram of an exemplary image of the difference between a document and a read image.
Figure 10:
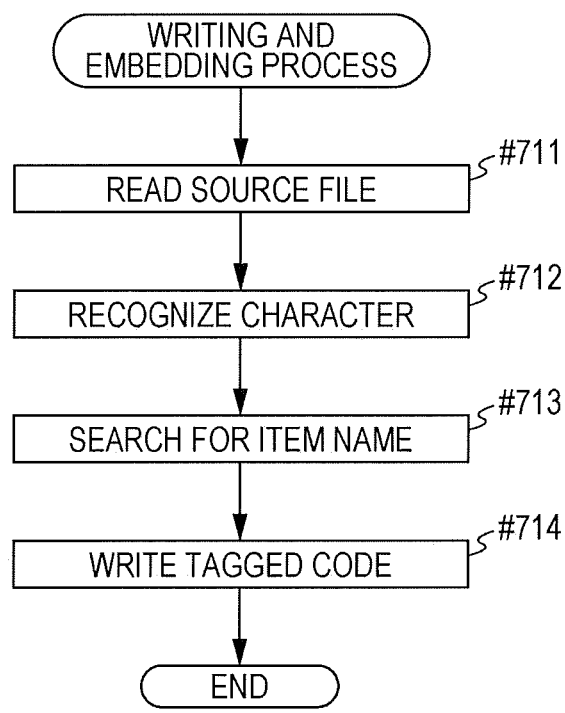
FIG. 10 is an explanatory flowchart of an exemplary flow of a writing and embedding process.

FIG. 4 is a diagram of an example of the document 50. FIG. 5 is a diagram of an example of the source file 60. FIG. 6 is a diagram of an example of the printed matter 4. FIG. 7 is a diagram of an example of the read image 53. FIG. 8 is an explanatory flowchart of the flow of a written image extracting process. FIG. 9 is a diagram of an example of an image of the difference between the document 50 and the read image 53. FIG. 10 is an explanatory flowchart of an exemplary flow of the writing and embedding process. FIGS. 11A and 11B are diagrams of examples of the source file 63.

The source file acquisition unit 101 obtains the source file in which a document is described. An example in which the source file 60 describing the document 50 illustrated in FIG. 4 will be described hereinafter. The document 50 is an agreement form on which areas in which the contractor writes the contractor's name and address are provided. However, there is no underline or frame showing the areas on the agreement form.

An example in which the source file 60 is described in XML as illustrated in FIG. 5 will be described hereinafter.

The source file acquisition unit 101 acquires the source file 60 as described below. The user creates the document 50 using an application program of the terminal device 2 and generates the source file 60. Meanwhile, the user puts a file name on the source file 60. Then, the user transmits the source file 60 to the image forming apparatus 1. Then, the source file acquisition unit 101 receives the source file 60.

When the source file acquisition unit 101 acquires the source file 60, the source file storage unit 102 stores the source file 60.

When the user designates the file name of the source file 60 and instructs the printed matter generation unit 103 to print the document 50, the printed matter generation unit 103 controls the print unit 10k to print the document 50 on a sheet in accordance with the source file 60. Meanwhile, a two-dimensional bar code 51 representing the file name of the source file 60 is added to the document 50.

This provides the printed matter 4 on which the document 50 and the two-dimensional bar code 51 are printed as illustrated in FIG. 6. For example, a Quick Response (QR) code (registered trademark) is used as the form (format) of two-dimensional bar code 51. Note that the alternate long and two short dashes line is shown to merely show the position of the image such as the document 50 and is not printed on the printed matter 4.

The user writes the user's name and address as the contractor on the printed matter 4 with a pen as illustrated in FIG. 7. Hereinafter, the image of the name will be referred to as a "written image 521" and the image of the address will be referred to as a "written image 522". The written image 521 and the written image 522 will collectively be referred to as a "written image 52".

Then, the user sets the printed matter 4 on the scan unit 10j of the image forming apparatus 1 so that the printed side of the printed matter 4 is read. Hereinafter, the image read from the printed side will be referred to as a "read image 53".

This reading inputs the image data of the read image 53 to the image forming apparatus 1. Hereinafter, the image data will be referred to as an "image data 61".

When the image data 61 is acquired, the written image extraction unit 104 extracts the written image 52 from the read image 53 in the process illustrated in FIG. 8.

The written image extraction unit 104 detects the two-dimensional bar code 51 from the read image 53 (#701 in FIG. 8), and identifies the file name by analyzing the two-dimensional bar code 51 (#702). The source file 60 with the file name is read from the source file storage unit 102 (#703). Matching the image represented by the image data 61 (namely, the document 50) and the image represented by the source file 60 (namely, the read image 53) extracts the image that is not included in the document 50 from the read image 53 (#704).

However, the extracted image still includes the two-dimensional bar code 51 as illustrated in FIG. 9. In light of the foregoing, the written image extraction unit 104 removes the two-dimensional bar code 51 from the written image 52 (#705). This extracts the written image 52.

Note that the printed matter generation unit 103 preferably processes the read image 53 in a process for converting the read image 53 into an binary image, a process for removing noise from the read image 53, or a process for correcting the inclination of the read image 53 before performing the process illustrated in FIG. 8.

The item name acquisition unit 105 acquires the text data 62 indicating the name of an item (the item name) corresponding to the written image 52 as described below.

The item name acquisition unit 105 extracts the image of a character string on a predetermined side next to the written image 52 from the read image 53.

For example, when the side is left, the item name acquisition unit 105 extracts the image of the character string "Name:" as the image of a character string at the left of the written image 521. Similarly, the item name acquisition unit 105 extracts the image of the character string "Address:" as the image of a character string at the left of the written image 522.

Then, the item name acquisition unit 105 converts the extracted images into text data. The text data is the text data 62.

Note that the process for extracting the images of the character strings and converting the images into the text data can be performed with a publicly known Optical Character Recognition (OCR) technique.

The source file generation unit 106 generates anew source file 63 by reflecting the written image 52 on the source file 60. The process for the generation is performed as illustrated in FIG. 10.

The source file generation unit 106 reads the source file 60 from the source file storage unit 102 (#711 in FIG. 10). The source file generation unit 106 recognizes the character string of the written image 52 (#712). In other words, the written image 52 is converted into text data. The source file generation unit 106 searches the source file 60 (see FIG. 5) for the character string described in the text data 62, namely, the character string of the item name corresponding to the written image 52 (#713). This search determines the position of the character string of the item name in the source file 60.

Then, the source file generation unit 106 writes a code <character string_1>text_2</character string_1> including tags <–> and </–> just after the determined position in the source file 60 (#714).

Note that the "character string_1" is a character string of the item name of the written image 52 from which predetermined characters (for example, ":", ";", and """ are deleted. The "text_2" is the character string recognized in step #721.

For example, when the written image 52 is the written image 521, the source file generation unit 106 searches for the "Name:" and determines the position. Then, the source file generation unit 106 writes the code <Name>John William</Name> just after the position. When the written image 52 is the written image 522, the source file generation unit 106 searches for the "Address:" and determines the position. Then, the source file generation unit 106 writes the code <Address>123 ABC street, NY</Address> just after the position.

As a result of the process, the source file illustrated in FIG. 11A is generated as the source file 63.

Alternatively, the source file generation unit 106 preferably generates an image file 64 of the written image 52, saves the image file 64 in a predetermined directory so as to write the character string indicating the place in which the image file 64 is saved and the file name as the text 2.

In such a case, the source file generation unit 106 generates the image file 64 of the written image 52 in step #712 instead of converting the written image 52 into the text data.

For example, when the image file 64 of the written image 521 is saved in a directory "dir01" and the file name of the image file 64 is "image001.gif", the code <Name>dir01/image001.gif</Name> is written. The code of the written image 522 is generated and written in a similar manner.

As a result, the source file illustrated in FIG. 11B is generated as the source file 63.

The source file 63 is saved in a predetermined directory, and used to search for, display, or print the document 50. The source file 63 is preferably transmitted to another device.

Figure 12:
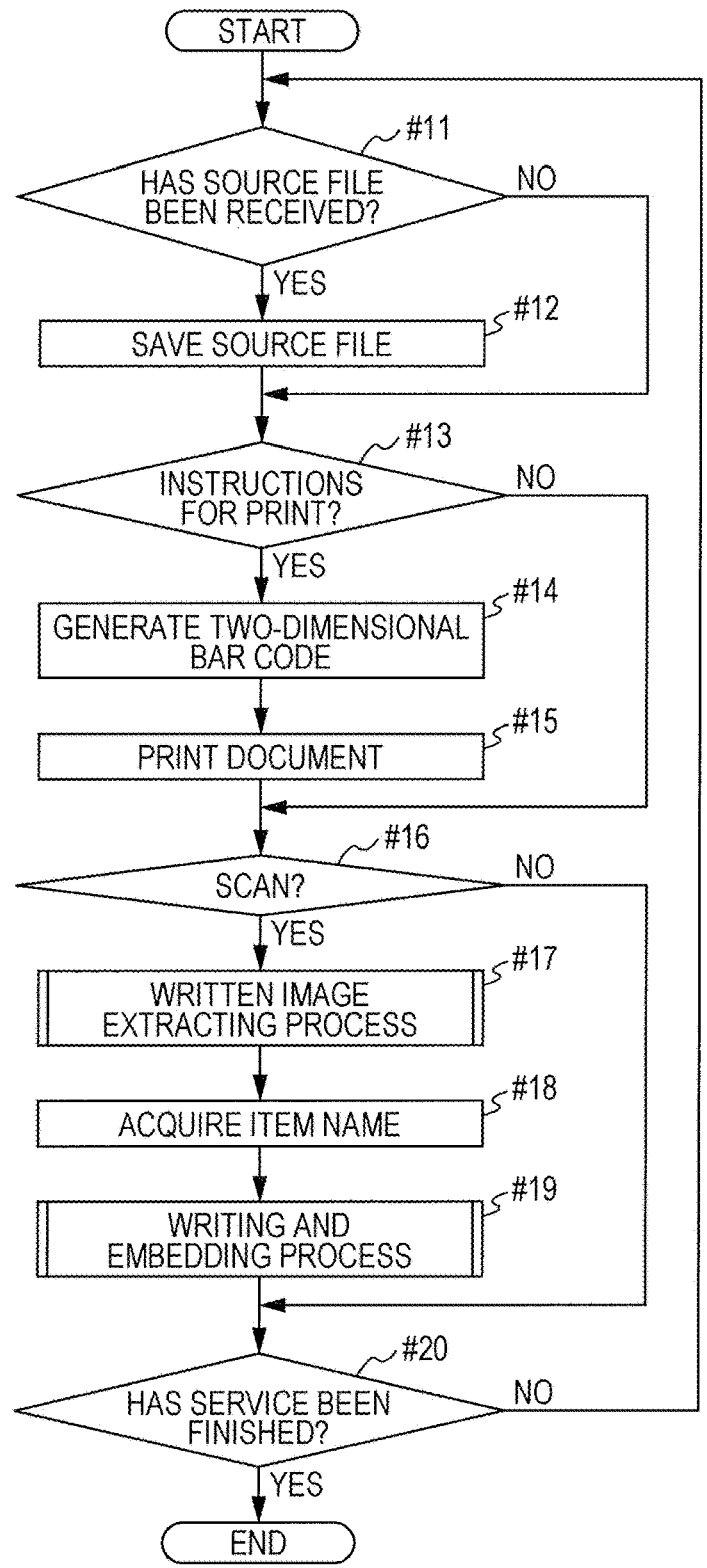
FIG. 12 is an explanatory flowchart of an exemplary flow of the whole process that the image forming apparatus performs.

FIG. 12 is an explanatory flowchart of an exemplary flow of the whole process that the image forming apparatus 1 performs.

Next, the flow of the whole process for reflecting the image hand-written by the user (the written image 52) on the source file 60 will be described with reference to the flowchart.

By the document structuring program 10P, the process is performed as illustrated in FIG. 12. Every time a predetermined event is generated, the image forming apparatus 1 performs a process in response to the event as described below.

When receiving the source file 60 from the terminal device 2 (Yes in #11), the image forming apparatus 1 saves the source file 60 in the source file storage unit 102 (#12).

Alternatively, when the file name of the source file 60 is designated and a command for printing the source file 60 is generated (Yes in #13), the image forming apparatus 1 generates the two-dimensional bar code 51 representing the file name (#14), and prints a document represented by the source file 60, namely, the document 50 and the generated two-dimensional bar code 51 on the sheet (#15). This generates the printed matter 4 (see FIG. 6).

The user writes the user's name and address on the printed matter 4 with a pen. Then, the user sets the printed matter 4 on the scan unit 10j so that the scan unit 10j scans the printed matter 4. This reads the read image 53 and generates the image data 61.

When the printed matter 4 is scanned and the image data 61 is generated with the scan unit 10j (Yes in #16), the image forming apparatus 1 extracts the written image 52 from the image represented by the image data 61, namely, the read image 53 (#17). The process for the extraction has been described above with reference to FIG. 8.

Furthermore, the image forming apparatus 1 acquires the data representing the item name of each image in the written image 52 (the text data 62) (#18).

Then, the image forming apparatus 1 writes the code about the written image 52 into the source file 60. The process for the writing has been described above with reference FIG. 10.

The image forming apparatus 1 properly performs the processes in step #12, in steps #14 and #15, and in steps #17 to #19 until the document structuring program 10P is completed.

According to the present embodiment, the information about the written image 52 is written into the source file 60. Using the source file 60 (namely, the source file 63) in which the information is written enables the user to use an existing search system without any change to search for the document 50 based on the written image 52. Additionally, describing the source files 60 and 63 in a language preferable to structure texts, such as XML, enables the user to more flexibly search for the file than the search for the data in a mere text format.

According to the present embodiment, even when an underline or frame surrounding a region in which the user is to hand-write characters is not printed on the printed matter 4, the written image 52 can be extracted, linked to a tag, and recorded.

Figure 14:
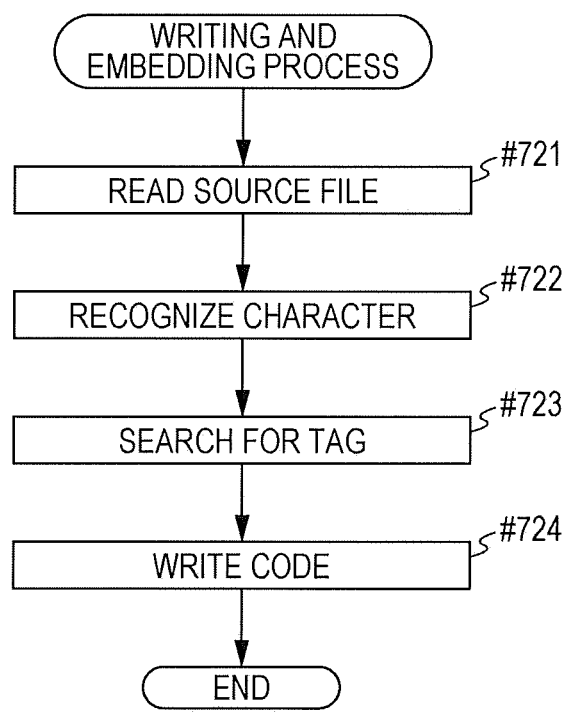
FIG. 14 is an explanatory flowchart of an exemplary flow of the writing and embedding process.

FIG. 13 is a diagram of an example of a source file 60'. FIG. 14 is an explanatory flowchart of an exemplary flow of the writing and embedding process.

According to the present embodiment, the source file generation unit 106 generates the tags <Name> and </Name>, namely, the tags for the written image 52. However, as illustrated in FIG. 13, the tags can previously be described in the source file 60. Hereinafter, the source file 60 in which the tags are previously described will be referred to as a "source file 60'".

In such a case, the source file generation unit 106 can generate the source file 63 as illustrated in FIG. 14.

As illustrated in FIG. 14, the source file generation unit 106 reads the source file 60' from the source file storage unit 102 (#721 in FIG. 14). The source file generation unit 106 recognizes the character string in the written image 52 (#722). In other words, the written image 52 is converted into the text data.

Furthermore, the source file generation unit 106 searches the source file 60' for the two tags indicating the character string of the item name corresponding to the written image 52 from which predetermined characters (for example, ":", ";", and """) is deleted (#723). This search determines the positions of the two tags. Note that the latter tag of the two tags includes a slash.

Then, the source file generation unit 106 writes the character string recognized in step #722 between the two tags.

The process described above brings about the same result as the present embodiment. In other words, the source file 63 as illustrated in FIG. 11A is provided.

In the exemplary embodiment, instead of the recognized character string, the image file 64 of the written image 52 is generated so that the place in which the image file 64 is saved and the name of the image file 64 can be written. In such as case, the source file 63 as illustrated in FIG. 11B is provided.

In the present embodiment, a QR code (registered trademark) is used as the two-dimensional bar code 51. However, a two-dimensional bar code in another format can be used. As long as the document 50 can be distinguished, a bar code or a character string can be used instead of the two-dimensional bar code 51.

The whole configurations of the document management system 100 and the image forming apparatus 1 or the configuration of each unit, the contents of each process, the order of the processes, data structures can properly be changed within the gist of the present invention.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image processing apparatus comprising:
a hardware processor configured to:
extract a written image written on a printed document by reading the printed document on which the written image is written; and
generate a subsequent document by writing the extracted written image into document data that was used to create the printed document, wherein the subsequent document is created by linking the extracted written image to a tag, the tag including a character string written in an adjacent image next to the extracted written image, wherein the document data is described in a mark-up language.

2. The image processing apparatus according to claim 1, wherein a predetermined tag is described in the document data,
when a name of the predetermined tag is represented in the adjacent image next to the extracted written image, the hardware processor generates the subsequent document by writing the extracted written image so that the extracted written image corresponds to the predetermined tag.

3. The image processing apparatus according to claim 1, wherein the hardware processor generates the subsequent document by writing a character string written in the extracted written image as the extracted written image.

4. The image processing apparatus according to claim 1, wherein the hardware processor generates the subsequent document by writing a file name of an image file of the extracted written image as the extracted written image.

5. The image processing apparatus according to claim 1, further comprising:
   a print unit configured to print the printed document and an identifier used to identify the printed document on a sheet; and
   a storage unit configured to store the document data after linking the document data to the identifier;
   wherein the hardware processor generates the subsequent document by writing the extracted written image into the document data linked to the identifier extracted from the printed document.

6. The image processing apparatus according to claim 5, wherein the hardware processor generates the subsequent document by writing information about an image from which the printed document and the identifier are removed as the extracted written image.

7. An image processing method comprising:
   extracting a written image written on a printed document by reading the printed document on which the written image is written; and
   generating a subsequent document by writing the extracted written image into document data that was used to create the printed document, wherein the subsequent document is created by linking the extracted written image to a tag, the tag including a character string written in an adjacent image next to the extracted written image, wherein the document data is described in a mark-up language.

8. A non-transitory recording medium storing a computer readable image processing program for causing a computer (hardware processor) to execute a process, the process comprising:
   an extracting step of extracting a written image written on a printed document by reading the printed document on which the written image is written; and
   a generating step of generating a subsequent document by writing the extracted written image into document data that was used to create the printed document, wherein the subsequent document is created by linking the extracted written image to a tag, the tag including a character string written in an adjacent image next to the extracted written image, wherein the document data is described in a mark-up language.

9. The non-transitory recording medium storing a computer readable image processing program according to claim 8, wherein a predetermined tag is previously described in the document data, and when a name of the predetermined tag is written in the adjacent image next to the written image, the extracted written image is written so that the written image information corresponds to the predetermined tag, and thus the subsequent document is generated in the generating step.

10. The non-transitory recording medium storing a computer readable image processing program according to claim 8, wherein a character string written in the written image is written as the extracted written image, and thus the subsequent document is generated in the generating step.

11. The non-transitory recording medium storing a computer readable image processing program according to claim 8, wherein a file name of an image file of the written image is written as the extracted written image, and thus the subsequent document is generated in the generating step.

12. The non-transitory recording medium storing a computer readable image processing program according to claim 8, wherein the process further comprises:
   a printing step of printing the printed document and an identifier used to identify the printed document on a sheet; and
   a storing step of storing the document data in a memory after linking the document data to the identifier; and
   the document data linked to the identifier extracted from the printed document is read from the memory and the extracted written image is written to the document data, and thus the subsequent document is generated in the generating step.

13. The non-transitory recording medium storing a computer readable image processing program according to claim 12, wherein information about an image from which the document and the identifier are removed is written as the extracted written image, and thus the subsequent document is generated in the generating step.

* * * * *